June 9, 1959 W. E. SHAFFER 2,890,065
TRAILER HITCH WITH PLURAL ARTICULATION AXES
Filed Nov. 21, 1957
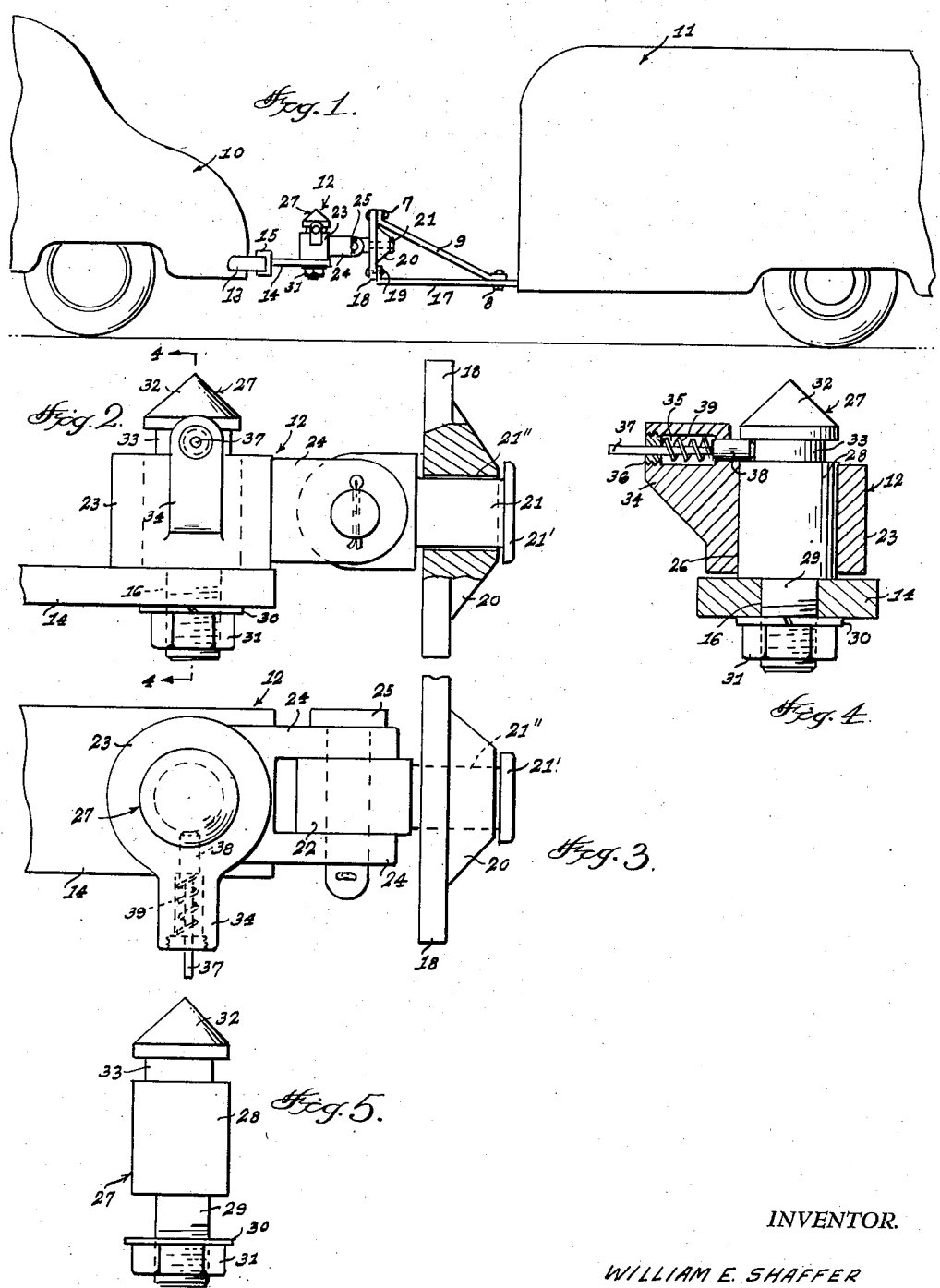
INVENTOR.
WILLIAM E. SHAFFER
ATTORNEYS

United States Patent Office 2,890,065  
Patented June 9, 1959

2,890,065

TRAILER HITCH WITH PLURAL ARTICULATION AXES

William E. Shaffer, Los Angeles, Calif.

Application November 21, 1957, Serial No. 697,905

2 Claims. (Cl. 280—492)

This invention relates to a coupling or hitch, and more particularly to a hitch for use with a towing vehicle such as an automobile, and a trailer.

The object of the invention is to provide a coupling which will permit vehicles such as trailers to be towed with greater safety and ease.

Another object of the invention is to provide a trailer hitch or coupling which is constructed so that a lock is provided for preventing accidental disengagement of the coupling, and wherein a means is provided for permitting the trailer to be readily coupled or connected to the vehicle when desired.

A further object of the invention is to provide a trailer hitch which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a side elevational view of the trailer hitch and showing a portion of the towing vehicle and trailer.

Figure 2 is an enlarged side elevational view of the coupling.

Figure 3 is a plan view of the coupling or trailer hitch.

Figure 4 is a sectional view taken on the line 4—4 of Figure 2.

Figure 5 is an elevational view of the pin which forms part of the coupling.

Referring in detail to the drawings, the numeral 10 designates a towing vehicle such as an automobile, and the numeral 11 indicates a trailer being towed, while the numeral 12 indicates generally the coupling or hitch of the present invention. The vehicle 10 is provided with the usual rear bumper 13, and there is provided a bar 14 which is connected to the bumper 13 as at 15. As shown in Figure 4, the rear portion of the bar 14 is provided with an aperture 16 for a purpose to be later described. A brace 9 extends in an inclined position as shown in Figure 1.

Extending forwardly from the trailer 11 is a tongue 17 which has an upstanding plate 18 formed integral therewith or secured thereto as at 19, and the plate 18 has a tapering portion 20. A securing element 21 extends through the plate 18, and the securing element 21 is connected to or formed integral with a bushing 22, Figure 3. An end of the pin 21 is peened over as at 21', and the pin 21 extends through an opening 21'' in the plate 18, Figure 2. The numeral 23 indicates a body member which is arranged contiguous to the upper rear surface of the bar 14, and extending rearwardly from the body member 23 and secured thereto or formed integral therewith is a pair of spaced parallel fingers 24, the fingers 24 being arranged on opposite sides of the bushing 22. A pivot bolt 25 extends through registering apertures in the fingers 24 and bushing 22. The body member 23 is provided with a vertically disposed bore 26, Figure 4. The numeral 27 indicates a pin which includes a cylindrical portion 28 that is arranged in the bore 26, and depending from the cylindrical portion 28 is a shank 29 of reduced diameter. The shank 29 has its lower end threaded, and a washer 30 is mounted on the shank 29 above a securing element or nut 31. As shown in the drawings, the nut and washer are arranged below the bar 14 for maintaining the parts in their proper assembled position.

The upper portion of the pin 27 is provided with an annular groove 33 and there is further provided an upper conical shaped head 32.

Extending outwardly from one side of the body member 23 and secured thereto or formed integral therewith is an enlarged shoulder 34 which is provided with a recess or chamber 35 therein. A plug 36 is mounted in an end of the recess 35, Figure 4, and the numeral 37 indicates an elongated stem which is slidably mounted in the plug 36. Secured to the inner end of the stem 37 or formed integral therewith is an enlarged finger 38 which is mounted for movement into and out of engagement with the groove 33 in the pin 27, and a coil spring 39 is positioned in the recess 35, the coil spring 39 being circumposed on the stem 37.

From the foregoing, it is apparent that there has been provided a trailer hitch which is especially suitable for coupling or connecting a trailer such as the trailer 11 to a towing vehicle such as the automobile 10. In use, with the parts arranged as shown in the drawings, it will be seen that the pivot bolt 25 provides a pivotal connection so that relative movement about an axis extending through the bolt 25 is permissible, as for example when the vehicles are traveling over uneven ground surfaces or the like. Furthermore, the provision of the pin 27 provides a vertical pivot whereby when the vehicles are going around curves or turning corners, or the like, the necessary freedom of movement is provided. When it is desired to disconnect the trailer from the vehicle 10, it is only necessary to manually pull out on the stem 37 which will retract the finger 38 from the groove 33. This will permit the body member 23 to be lifted up off of the pin 27 so that the trailer 11 can be disconnected from the vehicle 10. The pin 27 will remain connected to the bar 14 due to the provision of the nut 31 and washer or disk 30. When it is desired to connect the trailer to the vehicle, it is only necessary to place the body member 23 over the conical head 32, and the conical formation 32 acts as a guide so that the body member 23 will readily slip down onto the cylindrical portion 28 of the pin 27 and the spring 39 will then urge the finger 38 into locking engagement with the groove 33.

As previously stated, the bolt or finger 38 automatically seats in the groove 33 when the body member 23 moves down on the pin 27. The conical head 32 facilitates the placement of the body member 23 on the pin. The spring 39 automatically locks the finger 38 in the groove 33.

The parts can be made of any suitable material and in different shapes or sizes. The hitch will permit a trailer to be towed safely and wherein the locking mechanism is constructed so that the parts will not accidentally come loose, and wherein when the trailer is to be disconnected, a simple manual movement permits unlocking of the coupling. The device is constructed so that the pull is directed in such a manner as to prevent undue stress or strain on the parts. The only way that the device can be unlocked is by means of a manual operation, so that accidental opening is prevented.

The brace 9 may have its end portions anchored as at 7 and 8, and the brace 9 helps to maintain the plate 18 in its proper position, the plate 18 having its lower end secured to the front of the member 17 as at 19. The pin 21 and the pin 27 provide pivotal mountings whereby the parts can swivel in several different directions so as to prevent breakage of the parts. The pin 21 may be peened over or bradded over as at 21'. The swivel mounting permtis a complete 360 degree pivotal arrangement, as previously described.

Minor changes in shape, size and rearrangement of details coming within the field of invention claimed may be resorted to in actual practice, if desired.

I claim:

1. In a coupling, a bar adapted to be connected to a towing vehicle, there being an aperture in the rear of said bar, a tongue extending forwardly from a vehicle being towed, a vertically disposed plate on the front end of said tongue, and said plate having a tapered portion provided with an opening, a bushing arranged contiguous to the front of said plate, a pin projecting from said bushing and extending through the opening in said plate, a body member engaging the upper rear portion of said bar, a pair of spaced parallel fingers extending rearwardly from said body member and arranged on opposite sides of said bushing, a pivot bolt extending through said fingers and bushing, there being a vertically disposed bore in said body member registering with the aperture in said bar, a pin including a cylindrical portion arranged in the bore in said body member, a reduced diameter shank depending from said cylindrical portion and said shank extending through the aperture in said bar, a securing element threadedly engaging the lower end of said shank, a conical shaped head on the upper end of said pin, there being an annular groove in said pin below said head, a shoulder on one side of said body member, there being a recess in said shoulder, a movable finger in said recess and said finger being mounted for movement into and out of engagement with the groove in said pin, a plug engaging said shoulder contiguous to said recess, a stem extending from said finger and projecting through said plug, and a coil spring circumposed on said stem and positioned in said recess.

2. In a coupling, a bar adapted to be connected to a towing vehicle, there being an aperture in the rear of said bar, a tongue extending forwardly from a vehicle being towed, a vertically disposed plate on the front end of said tongue, and said plate having an opening, a bushing arranged contiguous to the front of said plate, a pin projecting from said bushing and extending through the opening in said plate, a body member engaging the upper rear portion of said bar, a pair of spaced parallel fingers extending rearwardly from said body member and arranged on opposite sides of said bushing, a pivot bolt extending through said fingers and bushing, there being a vertically disposed bore in said body member registering with the aperture in said bar, a pin arranged in the bore in said body member, said pin having a shank extending through the aperture in said bar, a head on the upper end of said pin, there being an annular groove in said pin below said head, a movable finger in said body member mounted for movement into and out of engagement with the groove in said pin, and a coil spring circumposed on said finger.

References Cited in the file of this patent

UNITED STATES PATENTS

| 2,133,065 | Weber | Oct. 11, 1938 |
| 2,457,885 | Gatch | Jan. 4, 1949 |
| 2,650,103 | Oehler | Aug. 25, 1953 |
| 2,676,032 | Stegeman | Apr. 20, 1954 |

FOREIGN PATENTS

| 604,394 | Germany | Oct. 22, 1934 |
| 127,662 | Sweden | Mar. 14, 1950 |